(12) United States Patent
Manahan et al.

(10) Patent No.: US 9,272,821 B2
(45) Date of Patent: Mar. 1, 2016

(54) FASTENING DEVICES FOR EXPLOSION-PROOF ENCLOSURES

(71) Applicants: Joseph Michael Manahan, Manlius, NY (US); Yabin Zhao, Liverpool, NY (US)

(72) Inventors: Joseph Michael Manahan, Manlius, NY (US); Yabin Zhao, Liverpool, NY (US)

(73) Assignee: Cooper Technologies Company, Houston, TX (US)

( * ) Notice: Subject to any disclaimer, the term of this patent is extended or adjusted under 35 U.S.C. 154(b) by 59 days.

(21) Appl. No.: 14/025,992

(22) Filed: Sep. 13, 2013

(65) Prior Publication Data
US 2015/0076156 A1 Mar. 19, 2015

(51) Int. Cl.
B65D 45/24 (2006.01)
H02G 3/08 (2006.01)

(52) U.S. Cl.
CPC .............. B65D 45/24 (2013.01); H02G 3/088 (2013.01)

(58) Field of Classification Search
CPC ........ B65D 42/24; B65D 43/26; B65D 43/22; H02B 1/28; H02K 5/00; H02G 3/088
USPC ............... 220/324, 560.01, 325; 292/257, 95, 292/100, 198, 200, DIG. 11; 248/226.11
See application file for complete search history.

(56) References Cited

U.S. PATENT DOCUMENTS

| | | | |
|---|---|---|---|
| 628,297 A | 7/1899 | Barr | |
| 896,145 A | 8/1908 | Payne | |
| 1,452,492 A | 4/1923 | Carpenter | |
| 1,482,049 A | 1/1924 | Swanson | |
| 1,836,949 A | 12/1931 | Balough | |
| 2,360,826 A | 10/1944 | Cherry | |
| 2,397,382 A | 3/1946 | Smith | |
| 2,643,904 A | 6/1953 | Wehmanen | |
| 2,762,473 A | 9/1956 | Swerdlow | |
| 2,914,149 A | 11/1959 | Walker | |
| 2,943,661 A | 7/1960 | Stern | |
| 3,018,127 A | 1/1963 | Dobrosielski et al. | |
| 3,349,947 A | 10/1967 | Zumwalt | |
| 3,360,155 A | 12/1967 | Colonna | |
| 3,362,573 A * | 1/1968 | Wales, Jr. .................... | 220/326 |
| 3,416,823 A | 12/1968 | Auer | |
| 3,419,227 A | 12/1968 | Werkmeister et al. | |

(Continued)

FOREIGN PATENT DOCUMENTS

| EP | 0346290 | 12/1989 |
|---|---|---|
| EP | 1970604 | 9/2008 |

(Continued)

*Primary Examiner* — Fenn Mathew
*Assistant Examiner* — Elizabeth Volz
(74) *Attorney, Agent, or Firm* — King & Spalding LLP

(57) ABSTRACT

An enclosure can include a first enclosure portion having a first flange, at least one first engagement feature disposed on a first inner surface of the first enclosure portion, and at least one mounting support. The enclosure can also include a second enclosure portion mechanically coupled to the first enclosure portion and having a second flange and at least one second engagement feature disposed on a second inner surface of the second enclosure portion. The enclosure can further include at least one fastening device mechanically and movably coupled to the at least one mounting support, where the at least one fastening device engages the first flange and the second flange when the one fastening device is in a closed position, and where the at least one fastening device is disengaged from the first flange and the second flange when the one fastening device is in an open position.

19 Claims, 6 Drawing Sheets

(56) References Cited

U.S. PATENT DOCUMENTS

| | | | |
|---|---|---|---|
| 3,514,009 A | 5/1970 | Emery et al. |
| 3,541,917 A | 11/1970 | VanDouwen et al. |
| 3,901,122 A | 8/1975 | Novotny |
| 3,910,155 A | 10/1975 | Wilson |
| 3,927,429 A | 12/1975 | Pearson |
| 3,974,933 A | 8/1976 | Toth et al. |
| 4,059,199 A | 11/1977 | Quaney |
| 4,139,118 A | 2/1979 | Parker |
| 4,157,146 A | 6/1979 | Svenson |
| 4,233,697 A | 11/1980 | Cornwall |
| 4,328,901 A | 5/1982 | Gunderman et al. |
| 4,497,418 A | 2/1985 | Nunlist |
| 4,620,061 A | 10/1986 | Appleton |
| 4,656,793 A | 4/1987 | Fons |
| 4,664,281 A | 5/1987 | Falk et al. |
| 4,729,584 A | 3/1988 | Beckerer, Jr. |
| 4,902,046 A | 2/1990 | Maloberti |
| 4,967,924 A | 11/1990 | Murofushi et al. |
| 5,004,129 A | 4/1991 | Loch et al. |
| 5,059,075 A | 10/1991 | Kelly |
| 5,104,141 A | 4/1992 | Grove et al. |
| 5,322,178 A | 6/1994 | Foos |
| 5,346,090 A | 9/1994 | Purohit et al. |
| 5,399,052 A | 3/1995 | Volkmann et al. |
| 5,413,441 A | 5/1995 | Heminger et al. |
| 5,534,664 A | 7/1996 | Fearing, Jr. et al. |
| 5,657,892 A | 8/1997 | Bolli et al. |
| 5,785,449 A | 7/1998 | DiBene |
| 5,888,140 A | 3/1999 | Klingler et al. |
| 6,302,416 B1 | 10/2001 | Schmack |
| 6,331,674 B1 | 12/2001 | Zolock et al. |
| 6,769,850 B2 | 8/2004 | Lay |
| 6,938,385 B2 | 9/2005 | Lind |
| 6,979,777 B2 * | 12/2005 | Marcou et al. ............... 174/50 |
| 7,124,908 B2 | 10/2006 | Sanders |
| 7,877,948 B2 | 2/2011 | Davies |
| 8,328,045 B2 | 12/2012 | Naumann et al. |
| 2001/0022926 A1 | 9/2001 | Kitayama et al. |
| 2010/0147854 A1 | 6/2010 | Fauveau |
| 2010/0178887 A1 | 7/2010 | Millam |
| 2011/0131898 A1 | 6/2011 | Nies et al. |
| 2012/0160052 A1 | 6/2012 | Manahan et al. |
| 2012/0267494 A1 | 10/2012 | Manahan |

FOREIGN PATENT DOCUMENTS

| | | |
|---|---|---|
| JP | 08026314 | 1/1996 |
| JP | 08233108 | 9/1996 |
| JP | 0932923 | 2/1997 |
| JP | 10101108 | 4/1998 |
| JP | 2008105746 | 5/2008 |
| JP | 4847646 | 10/2011 |
| WO | 2011084152 | 7/2011 |

* cited by examiner

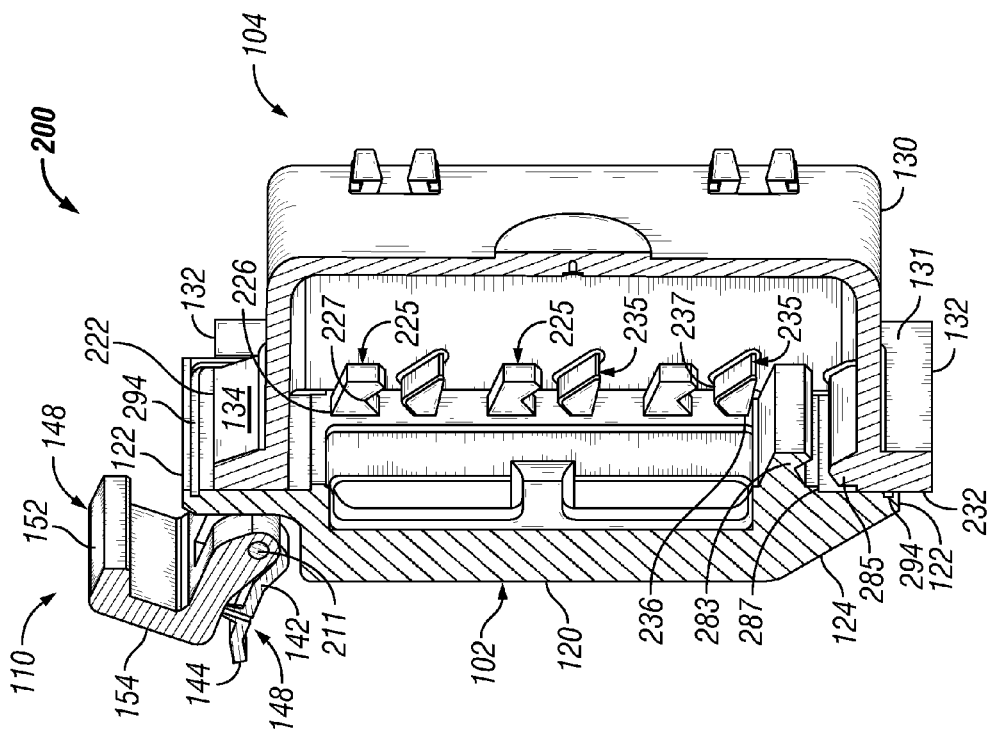
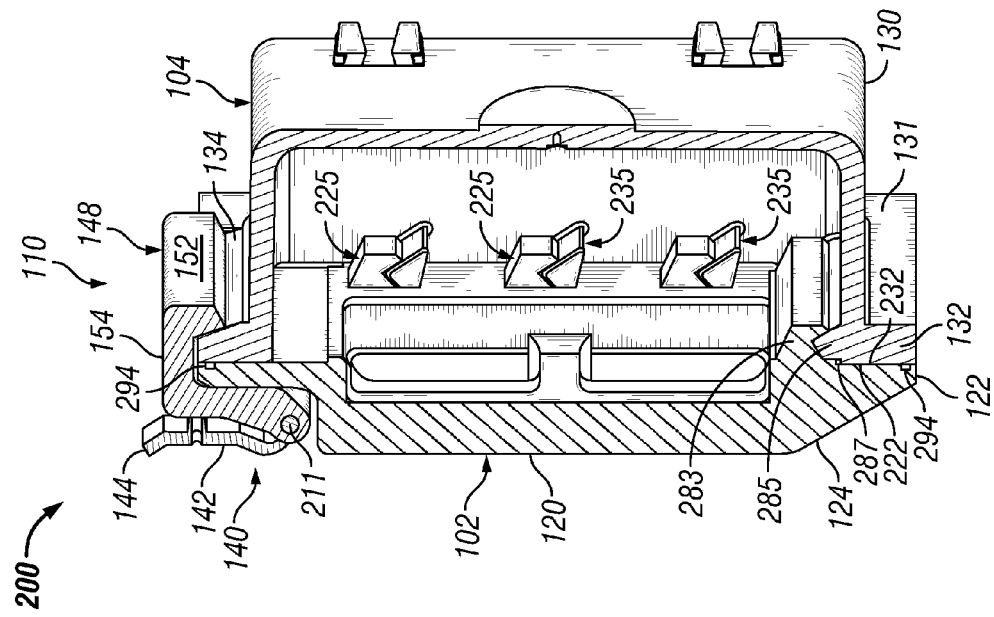

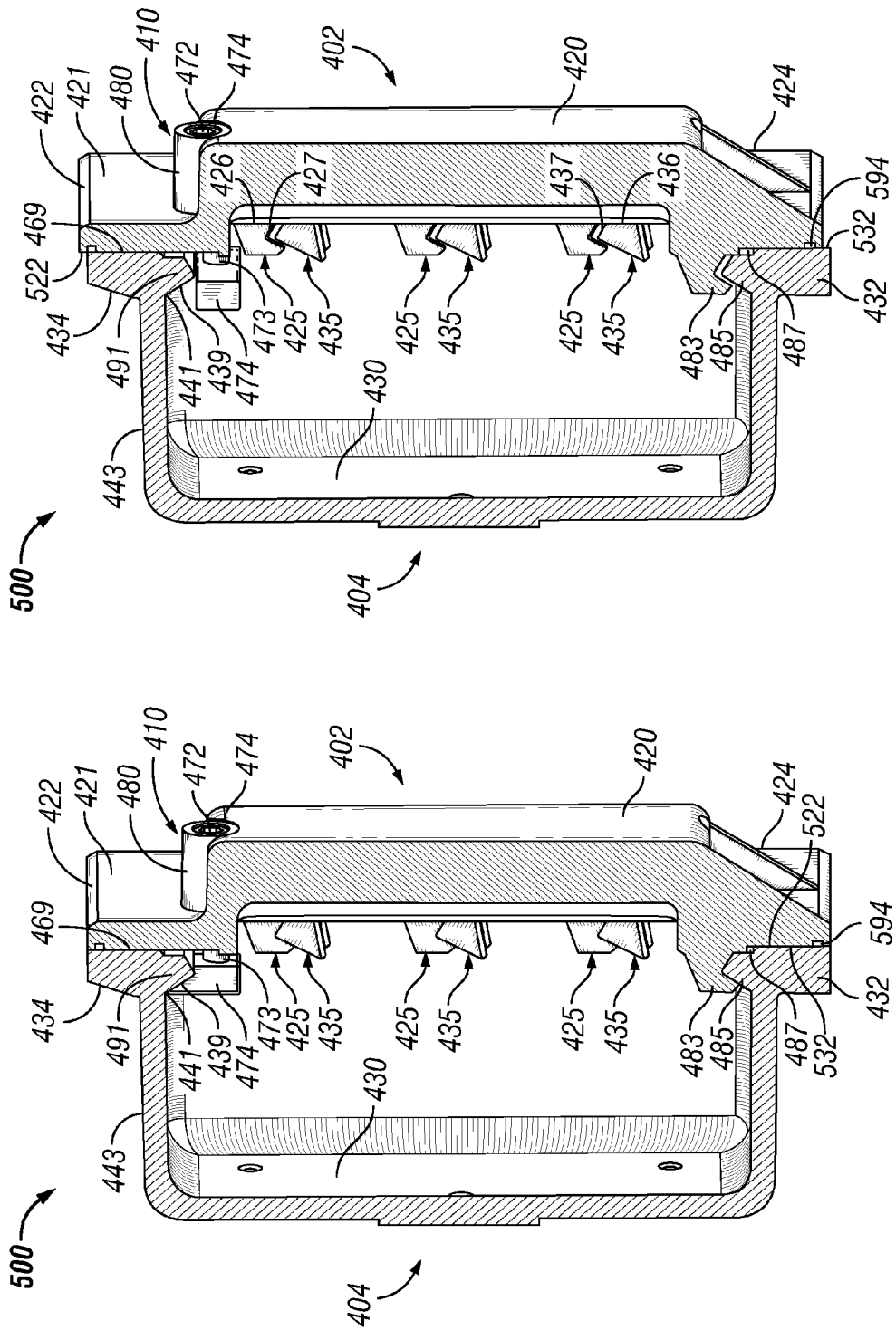

FASTENING DEVICES FOR EXPLOSION-PROOF ENCLOSURES

CROSS-REFERENCE TO RELATED APPLICATION

The present application is related to U.S. patent application Ser. No. 13/794,402, entitled "Fastening Devices for Explosion-Proof Enclosures," filed with the U.S. Patent and Trademark Office on Mar. 11, 2013, and whose entire contents are hereby incorporated herein by reference.

The present application is also related to U.S. patent application Ser. No. 14/025,896 titled "Fastening Devices for Explosion-Proof Enclosures," which is being filed concurrently with the U.S. Patent and Trademark Office.

TECHNICAL FIELD

The present disclosure relates generally to explosion-proof enclosures, and more particularly to systems, methods, and devices for securing a cover of an explosion-proof enclosure to a body of the explosion-proof enclosure.

BACKGROUND

Explosion-proof receptacle housings and enclosure systems are used in many different industrial applications. Such explosion-proof receptacle housing and enclosure systems may be used, for example, in military applications, onboard ships, assembly plants, power plants, oil refineries, petrochemical plants, and other harsh environments. At times, the equipment located inside such explosion-proof receptacle housing and enclosure systems is used to control motors and other industrial equipment.

In order for an explosion-proof enclosure to meet certain standards and requirements, the cover of the enclosure must be sealed to the body of the enclosure within certain tolerances. Often, this requires a large number (30 or more) of bolts to be tightened. Consequently, securing all of the bolts at the appropriate torque is a very time-consuming process. In addition, removing all of the bolts to access one or more components inside the explosion-proof enclosure is a time-consuming process. Further, if all of the bolts are not reinserted and properly torqued, insufficient sealing can result, thereby creating a point of environmental ingress and/or loss of explosion-proof integrity.

SUMMARY

In general, in one aspect, the disclosure relates to an enclosure. The enclosure can include a first enclosure portion having a first flange, at least one first engagement feature disposed on a first inner surface of the first enclosure portion, and at least one mounting support. The enclosure can also include a second enclosure portion mechanically coupled to the first enclosure portion and having a second flange and at least one second engagement feature disposed on a second inner surface of the second enclosure portion. The enclosure can further include at least one fastening device mechanically and movably coupled to the at least one mounting support, where the at least one fastening device engages the first flange and the second flange when the at least one fastening device is in a closed position, where the at least one fastening device is disengaged from the first flange and the second flange when the at least one fastening device is in an open position. The at least one first engagement feature can couple to the at least one second engagement feature when the at least one fastening device is in the closed position. A first flame path can be maintained between the first flange and the second flange when the at least one fastening device is in the closed position.

These and other aspects, objects, features, and embodiments will be apparent from the following description and the appended claims.

BRIEF DESCRIPTION OF THE DRAWINGS

The drawings illustrate only example embodiments of fastening devices for explosion-proof enclosures and are therefore not to be considered limiting of its scope, as fastening devices for explosion-proof enclosures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 2A and 2B show cross-sectional side perspective views of the explosion-proof enclosure of FIG. 1 detailing the example fastening devices in accordance with certain example embodiments.

FIGS. 5A and 5B show cross-sectional side perspective views of the explosion-proof enclosure of FIG. 4 detailing the example fastening device in accordance with certain example embodiments.

DETAILED DESCRIPTION OF EXAMPLE EMBODIMENTS

Figure 1:
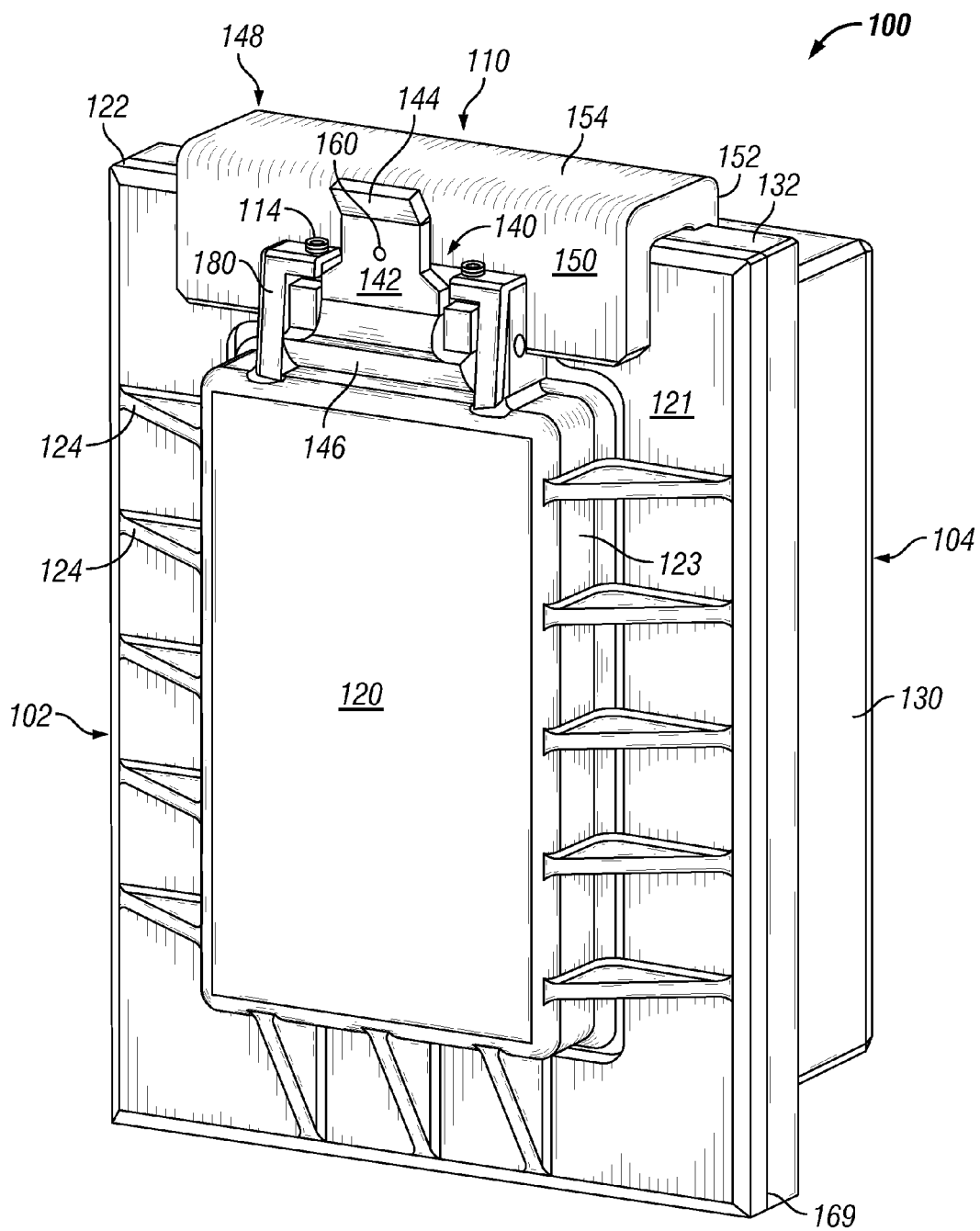
FIG. 1 shows a front perspective view of an explosion-proof enclosure with example fastening devices in accordance with certain example embodiments.

The example embodiments discussed herein are directed to systems, apparatuses, and methods of fastening a cover of an explosion-proof enclosure to a body of the explosion-proof enclosure. While the example embodiments discussed herein are with reference to explosion-proof enclosures, other types of non-explosion-proof enclosures (e.g., junction boxes, control panels, lighting panels, motor control centers, switchgear cabinets, relay cabinets) or any other type of enclosure (e.g., hazardous enclosure) may be used in conjunction with example embodiments of fastening devices.

As used herein, the cover and the body of an enclosure can be referred to as enclosure portions. Further, while example fastening devices are shown in the accompanying figures as being mechanically coupled to the cover of an enclosure, example fastening devices can, additionally or alternatively, be mechanically coupled to the body of the enclosure. Similarly, while example flange relief features are shown being disposed on the body, example flange relief features can, additionally or alternatively, be disposed on the cover.

In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide an uninterrupted path, from inside the explosion-proof enclosure toward the outside of the explosion-proof enclosure, along which one or more gases may travel. A joint may be a mating of any two or more surfaces. Each surface may be any type of surface, including but not limited to a flat surface, a threaded surface, a rabbet surface, and a serrated surface.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class I, Division 1) and Underwriters' Laboratories, Inc. (UL) (e.g., UL 1203). For example, a Class I hazardous area under the National Electric Code is an area in which flammable gases or vapors may be present in the air in sufficient quantities to be explosive.

As a specific example, NEMA standards for an explosion-proof enclosure of a certain size (e.g., 100 cm$^3$) or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Some standards also require that one or more tools are used to open an explosion-proof enclosure. Example embodiments described herein require the use of a tool, whether custom made or standard, to disengage the fastening device and open the explosion-proof enclosure. Each of the components of the example fastening devices (e.g., fastener, fastener receiver, load distributing member, handle, cam, pin) can be made from one or more of a number of suitable materials, including but not limited to stainless steel, plastic, aluminum, ceramic, rubber, and iron.

Example enclosures described herein can be exposed to one or more environments (e.g., hazardous, corrosive, high temperature, high humidity) that can cause the enclosure cover and the enclosure body to become fused together to some extent. In such a case, example cover release mechanisms can be used to assist in prying apart the enclosure cover from the enclosure body. For example, such a cover release mechanism can be useful when oxidation has formed between the cover flange and the body flange. In such a case, an improper method of prying apart the enclosure cover and the enclosure body can result in damage (e.g., scoring, pitting, gouging) to the cover flange and/or the body flange. Examples of cover release mechanisms can be found in U.S. patent application Ser. No. 13/794,433 entitled "Cover Release Mechanisms for Enclosures," the entire contents of which are hereby incorporated by reference.

Example embodiments of fastening devices for explosion-proof enclosures will be described more fully hereinafter with reference to the accompanying drawings, in which example embodiments of fastening devices for explosion-proof enclosures are shown. Fastening devices for explosion-proof enclosures may, however, be embodied in many different forms and should not be construed as limited to the example embodiments set forth herein. Rather, these example embodiments are provided so that this disclosure will be thorough and complete, and will fully convey the scope of fastening devices for explosion-proof enclosures to those or ordinary skill in the art. Like, but not necessarily the same, elements (also sometimes called components) in the various figures are denoted by like reference numerals for consistency.

FIG. 1 shows a front perspective view of an explosion-proof enclosure 100 with example fastening devices 110 in accordance with certain example embodiments. In one or more embodiments, one or more of the features shown in FIG. 1 may be omitted, added, repeated, and/or substituted. Accordingly, embodiments of an explosion-proof enclosure with fastening devices should not be considered limited to the specific arrangements of components shown in FIG. 1.

Referring to FIG. 1, the explosion-proof enclosure 100 includes an enclosure cover 102 and an enclosure body 104. The enclosure cover 102 can include an elevated inner portion 120, an outer portion 121, one or more transitional supports 124 between the elevated inner portion 120 and the outer portion 121, and a cover flange 122 disposed around the perimeter of the outer portion 121 of the enclosure cover 102. A wall 123 can join the elevated inner portion 120 and the outer portion 121. The wall 123 can also be coupled to one or more of the transitional supports 124.

In certain example embodiments, the enclosure body 104 includes a base 130 having a back and one or more walls adjacent to the back. The enclosure body 104 can also include a body flange 132 disposed at the end of the one or more walls of the base 130. The body flange 132 can be disposed around the perimeter of the base 130 of the enclosure body 104. When the enclosure cover 102 is mechanically coupled to the enclosure body 104, the cover flange 122 is mated to a body flange 132. Specifically, as shown, for example, in FIGS. 2A and 2B below, the interior surface 222 of the cover flange 122 is mated to the interior surface 232 of the body flange 132.

As shown in FIG. 1, only one example fastening device 110 is used. In this case, the fastening device 110 is disposed along the top end of the enclosure 100. Alternatively, more than one fastening device 110 disposed toward one or more ends and/or or sides of the enclosure 100 can be used. The fastening device 110 can have an open position (where the fastening device 110 is not engaging the cover flange 122 and the body flange 132) and a closed position (where the fastening device 110 is engaging the cover flange 122 and the body flange 132). In FIG. 1, the fastening device 110 is shown in the closed position. The air gap that forms between the surfaces of the cover flange 122 and the body flange 132 when the cover flange 122 and the body flange 132 converge is the flame path 169. Specifically, the flame path 169 is formed between the interior surface 222 of the cover flange 122 and the interior surface 232 of the body flange 132, beginning from the interior of the enclosure until the path between the interior surface 222 and the interior surface 232 is interrupted, as by a sealing member One of the functions of the fastening device 110 is to ensure that the flame path 169 is within an accepted tolerance in light of a particular standard for the explosion-proof enclosure 100.

The enclosure cover 102 (sometimes generically called an enclosure portion) and the enclosure base 104 (sometimes also generically called an enclosure portion) of the explosion-proof enclosure 100 are secured using the fastening device 110. The fastening device 110 in this case includes a bracket 148. The bracket 148 as shown in FIG. 1 is substantially U-shaped, but the bracket 148 can also have one or more of a number of other shapes. The bottom side 152 of the bracket 148 can be antiparallel to the top side 150, where the top side 150 is substantially perpendicular to the back side 154 that joins (mechanically couples) the top side 150 and the bottom side 152. The back side 154 can form a single piece with the top side 150 and/or the bottom side 152, as in a forged manufacturing process. Alternatively, the back side 154 can be a separate member that is mechanically coupled to the top side 150 and/or the bottom side 152. In such a case, the back side 154 can be mechanically coupled to the top side 150 and/or the bottom side 152 using one or more of a number of methods, including but not limited to welding, fastening devices, epoxy, and overlaying brackets, and slotted receivers.

In certain example embodiments, the bracket 148 includes one or more of a number of optional features. For example, one or more optional ribs can be disposed substantially vertically along the inner surface of the back side 154 of the bracket 148. In addition, or in the alternative, the ends of each rib may be disposed on the bottom surface of the top side 150 and/or on the top surface of the bottom side 152 of the bracket 148. Any such ribs can be of any dimensions (e.g., length, width, height, thickness) and/or shape. The dimensions of a 124 can be substantially similar to some or all other ribs disposed on the underside of the bracket 148.

In addition to enhancement of the structural integrity of the bracket 148 for maintaining a flame path 169 between the cover flange 122 and the body flange 132, the ribs can be used for one or more other purposes. For example, the ribs can be used to properly position and maintain contact by the bracket 148 with a particular portion of the cover flange 122 and/or the body flange 132. In such a case, recesses can be cut into one or more surfaces of the cover flange 122 and/or the body flange 132 that contact the ribs when the bracket 148 is properly positioned. Each example recess can have dimensions (e.g., depth, width, length) that are slightly larger than the corresponding dimensions of the rib that mechanically couples with the recess. A recess can be cut into an outer edge of the cover flange 122, an outer edge of the body flange 132, a top surface of the cover flange 122, and/or a bottom surface of the body flange 132.

In certain example embodiments, the top side 150 of the bracket 148 is longer than the bottom side 152. In such a case, there is more overlap of the cover flange 122 by the top side 150 relative to the amount of overlap of the base flange 132 by the bottom side 152. The length of the top side 150 can depend on one or more of a number of factors, including but not limited to the size of the cover 102, the thickness of the top side 150, and the location of any components (e.g., indicating lights, switch handle, viewing window) disposed on the surface of the cover 102.

In addition, some or all of the bracket 148 can be made thicker to improve the structural integrity of the bracket 148. The added thickness of the bracket 148 can extend to all or select portions (i.e., the top side 150, the bottom side 152, and the back side 154) of the bracket 148. In addition, the added thickness of the bracket 148 can be made to all or select portions of the top side 150, the bottom side 152, and/or the back side 154. The thickness of the bracket can be measured with or without consideration of the ribs 124 on the underside of the bracket 148.

When the bracket 148 is engaged with the enclosure 100, the top side 150 of the bracket 148 contacts at least a portion of the top surface (the outer portion 121) of the cover flange 122 (and also, in some cases, wall 123 and/or the elevated inner portion 120), and the bottom side 152 of the bracket 148 contacts at least a portion of the bottom surface of the base flange 132. In certain example embodiments, the cover flange 122 and/or the body flange 132 is shaped to conform to the bracket 148. For example, in this case, the bottom portion of the body flange 132 includes a chamfer that is formed at a downward angle that is substantially parallel to the bottom side 152 of the bracket 148 when the bracket 148 is engaged with the explosion-proof enclosure 100. In certain alternative example embodiments, the bottom side 152 is substantially perpendicular to the back side 154, and the top side 150 is antiparallel to the bottom side 152. In such a case, the body flange 132 does not include the chamfer, but the top portion of the cover flange 122 does include a chamfer that is cut at an upward angle and is substantially parallel to the top side 150 of the bracket 148 when the bracket 148 is engaged with the explosion-proof enclosure 100.

The top side 150 of the bracket 148 can include an engagement portion (hidden from view). The engagement portion is located at the distal end of the top side 150 and is mechanically coupled to the lever 140 (described below). The engagement portion can form a single piece with the top side 150, as in a forged manufacturing process. Alternatively, the engagement portion can be a separate member that is mechanically coupled to the top side 150. In such a case, the engagement portion can be mechanically coupled to the top side 150 using one or more of a number of methods, including but not limited to welding, fastening devices, epoxy, and overlaying brackets, and slotted receivers. The engagement portion can be fixedly coupled or movably (e.g., hingedly) coupled to the lever 140.

In certain example embodiments, the fastening device 110 is "boltless," meaning that such a fastener (e.g., bolt, screw) is not used to directly couple the cover flange 122 and the body flange 132. More importantly, the enclosure cover 102 is not penetrated throughout its thickness, which would create an additional flame path. In addition, optionally, the top side 150, the back side 154, and/or the bottom side 152 each can have an array of protrusions. Such protrusions can serve one or more of a number of purposes. For example, the protrusions can provide structural reinforcement and maintain mechanical integrity of the bracket 148. Each protrusion can be of any height and/or thickness. In addition, each protrusion can have varying heights and/or thicknesses along the length of the protrusion. The protrusions can form a single piece with the bracket 148, as in a forged manufacturing process. Alternatively, the protrusions can be separate members that are mechanically coupled to the bracket 148. In such a case, the protrusions can be mechanically coupled to the bracket 148 using one or more of a number of methods, including but not limited to welding, fastening devices, epoxy, and overlaying brackets, and slotted receivers.

In addition to the bracket 148, the fastening device 110 can include a lever 140. The lever 140 can include a handle 144 located at the distal end, a body 142, and a hinged coupling feature 146 (which can also be called a retaining feature or a detent) at the proximal end. In certain example embodiments, the lever 140 is mechanically coupled to the top side 150 using the hinged coupling feature 146. For example, the hinged coupling feature 146 can hingedly couple to a corresponding engagement portion of the top side 150. In such a case, a tubular aperture can traverse the length of both the hinged coupling feature 146 and the engagement portion, and the two pieces are joined by inserting a pin (described below with respect to FIGS. 3A-3C) into the apertures. The pin maintains the hinged coupling between the bracket 148 and the lever 140.

The lever 140 can also be mechanically coupled to the bracket 148 in one or more of a number of other ways. In any case, when the lever 140 is engaged, the coupling between the lever 140 and the bracket 148 causes the bracket 148 to become engaged with the enclosure 100. Likewise, when the lever 140 is disengaged, the coupling between the lever 140 and the bracket 148 causes the bracket 148 to become disengaged from the enclosure 100.

In addition or in the alternative, the coupling feature 146 can be used to mechanically couple other various components of the fastening device 110 and/or explosion-proof enclosure 100 to each other. For example, the coupling feature 146 can mechanically couple the enclosure cover 102 to the bracket 148. As another example, the coupling feature 146 can mechanically couple the enclosure body 104 to the bracket 148. In such a case, the coupling feature 146 can include one or more pieces that can each have one or more of a number of features (e.g., sliding features, hinged features, fastening receivers) to allow the coupling feature 146 to couple together components of the fastening device 110 and/or explosion-proof enclosure 100.

In certain example embodiments, the fastening device 110 (or portions thereof) are mechanically and movably coupled to at least one mounting support 180, where the mounting support 180 is mounted to the outer surface of the enclosure cover 102. For example, at least one mounting support 180 can be mechanically coupled to the wall 123 that joins the elevated inner portion 120 and the outer portion 121 of the enclosure cover 102. As another example, the at least one mounting support 180 can be disposed on the outer portion 121 adjacent to the elevated inner portion 120. In any case, the mounting support 180 can be mounted on the enclosure cover 102 using one or more methods, including but not limited to welding, fastening devices, and mating threads. In this particular example, two mounting supports 180 and the wall 123 form a single piece, as from a casting process.

In addition, or in the alternative, the mounting supports 180 can be mechanically coupled to the enclosure body 104. Each mounting support can include a fastener 114. The fastener 114 can adjust the compressive force applied by the fastening device 110 and is discussed in more detail below with respect to FIGS. 3A-3C. In this example, the hinged coupling feature 146 of the fastening device 110 is hingedly coupled to the mounting supports 180 and fixedly coupled to the bracket 148. Further, the handle 144 is fixedly coupled to the hinged coupling feature 146 and allows the fastening device 110 to move between the open position and the closed position.

FIGS. 2A and 2B show cross-sectional side perspective views of an enclosure system 200 that includes the explosion-proof enclosure of FIG. 1 and detailing the example fastening device 110 in accordance with certain example embodiments. Specifically, FIG. 2A shows the enclosure cover 102 mechanically coupled to the enclosure body 104. FIG. 2B shows the enclosure cover 102 mechanically decoupled from the enclosure body 104. In one or more embodiments, one or more of the features shown in FIGS. 2A and 2B may be omitted, added, repeated, and/or substituted. Accordingly, embodiments of an explosion-proof enclosure with fastening devices should not be considered limited to the specific arrangements of components shown in FIGS. 2A and 2B.

Referring to FIGS. 1-2B, the fastening device is partly disposed on the enclosure cover 102 and partly on the enclosure body 104. Specifically, at least one engagement feature 225 of the fastening device is disposed on the inner surface of the enclosure cover 102. In certain example embodiments, each engagement feature 225 is disposed on the back side of the outer portion 121 of the enclosure cover 102. Similarly, at least one engagement feature 235, which complements the engagement feature 225, is disposed on the enclosure body 104. For example, as shown in FIGS. 2A and 2B, each engagement feature 235 can be disposed on an inner surface of a side wall of the enclosure body 104.

The engagement feature 225 can have one or more of a number of shapes and features. For example, as shown in FIGS. 2A and 2B, the engagement feature 225 can have a base 226 that is coupled to the enclosure cover 102 and a mating feature 227. The mating feature 227 is shown having a wedge shape, but the mating feature 227 can have one or more of a number of other shapes, including but not limited to an arc, a square, a sawtooth, and a sinusoid. The width (thickness) of each engagement feature 225 can vary, and can be substantially uniform or variable along its length.

Similarly, the engagement feature 235 can have one or more of a number of shapes and features that complement those of the engagement feature 225 to which the engagement feature 235 couples. As shown in FIGS. 2A and 2B, the engagement feature 235 can have a base 236 that is coupled to the enclosure cover 102 and a mating feature 237. For example, if the shape of the mating feature 227 for the engagement feature 225 is a wedge or triangle, then the shape of the mating feature 237 for the engagement feature 235 can also be a wedge or triangle that complements the mating feature 227 so that the engagement feature 225 can mechanically couple to the engagement feature 235 when the fastening device 110 is in the closed position.

In certain example embodiments, the engagement feature 225 disposed on the inner surface of the enclosure cover 102 is adjustable to ensure that the flame path 169 between the cover flange 122 and the body flange 132 complies with specifications. In addition, or in the alternative, the engagement feature 235 disposed on the inner surface of the enclosure body 104 is adjustable (as by a user or a manufacturer) to ensure that the flame path 169 between the cover flange 122 and the body flange 132 complies with specifications. For example, the engagement feature 235 can be adjusted by a manufacturer so that the flame path 169 complies with specifications upon first use by a user. As another example, the engagement feature 235 can be adjusted by a user to compensate for wear and/or maintenance over time so that the flame path 169 complies with specifications.

The engagement feature 225 and/or the engagement feature 235 can be adjustable in one or more of a number of ways. For example, the engagement feature 225 can be disposed within a track (e.g., a slot) that is continuous or has a number of discrete positions along its length. In such a case, the engagement feature 225 can be moved by a user to help ensure a proper flame path 169 between the cover flange 122 and the body flange 132. As another example, the engagement feature 235 can have a fastening feature (e.g., an aperture that traverses therethrough) that couples (either directly or using an additional device, such as a bolt) to one of a number of complementary fastening features (e.g., apertures that traverse into a portion of a wall).

In certain example embodiments, the engagement features 225 move in response to movement of the fastening device 110. In other words, as the fastening device 110 moves between the open position and the closed position, the engagement features 225 also move. Thus, when the fastening device 110 is moved into the closed position, the engagement features 225 become engaged with (mechanically couple to) the engagement features 235. In addition, or in the alternative, the engagement features 235 can move in response to movement of the fastening device 110.

In any case, when the fastening device 110 is in the open position, the enclosure cover 102 can be decoupled (removed) from the enclosure body 104. If the engagement features 225 and/or the engagement features 235 do not move in response to the movement of the fastening device 110, then the enclosure cover 102 may have to be moved in a certain direction (e.g., upward) before the enclosure cover 102 can be removed from the enclosure body 104. The hinged coupling feature 146 and the mounting supports 180 can be joined by inserting a pin 211 into apertures that traverse some or all of the hinged coupling feature 146 and the mounting supports 180. The pin 211 can maintain the hinged coupling between the hinged coupling feature 146 and the mounting supports 180 and allow the fastening device 110 to move between the closed position and the open position.

FIGS. 2A and 2B also show how the rear surface 131 of the body flange 132 can be configured to engage the bottom side 152 of the bracket 148 of the fastening device 110. Specifically, a portion 134 of the rear surface 131 of the body flange 132 can have a different contour than the rest of the rear surface 131. For example, as shown in FIGS. 2A and 2B, the shape and orientation of the portion 134 can be substantially the same as the shape and orientation of the inner surface of the bottom side 152 of the bracket 148 when the fastening device 110 is in the closed position. In other words, the portion 134 of the body flange 132 has a vertical profile that is less (and a horizontal profile that is more) than that of a remainder (i.e., the rest of the rear surface 131) of the body flange 132, where the bracket 148 engages the cover flange 122 and the portion 134 of the body flange 131 when the lever 140 is in the closed position, and where the bracket 148 is disengaged from the cover flange 122 and the portion 134 of the body flange 132 when the lever 140 is in the open position.

In certain example embodiments, a sealing member 294 (e.g., gasket, o-ring) is fit inside a channel (hidden from view by the sealing member 294) on the bottom surface of the cover flange 122 and/or the top surface of the base flange 132. In such a case, as the bracket 148 is drawn toward the explosion-proof enclosure 200, the gasket 294 is compressed, providing a seal against ingress while providing a flame path 169 that meets one or more applicable standards (e.g., flame path 169 no greater than 0.0015 inches). The sealing member 294 can be any type of sealing member (e.g., gasket, o-ring) made of a compressible material (e.g., rubber, silicon).

In certain example embodiments, the enclosure cover 102 and/or the enclosure body 104 can include a securing feature to help the enclosure cover 102 become properly aligned with the enclosure body 104 when the enclosure cover 102 is coupled to the enclosure body 104. For example, as shown in FIGS. 2A and 2B, the enclosure cover 102 can include a securing feature 283 disposed on the inner surface of the enclosure cover 102. The securing feature 283 can be disposed on any side (e.g., toward the bottom end) of the enclosure cover 102. In some cases, the securing feature 283 is positioned on a side opposite where the fastening device 110 is positioned. The securing feature 283 can have a shape and/or size that complements the securing feature 285 disposed on the inner surface of the enclosure body 104. The shape and/or size of the securing feature 283 and the securing feature 285 can vary.

The securing feature 283 and/or the securing feature 285 can be segmented and/or have a single member with a size and shape that is substantially similar to the engagement feature 225 and/or the engagement feature 235, respectively. When the securing feature 283 and/or the securing feature 285 is elongated, as shown in FIGS. 2A and 2B, an additional feature 287 can be disposed on the inner surface of the enclosure cover 102 and/or the enclosure body 104 to help ensure that the interior surface 222 of the cover flange 122 has proper surface contact with the interior surface 232 of the body flange 132.

Figure 3B:
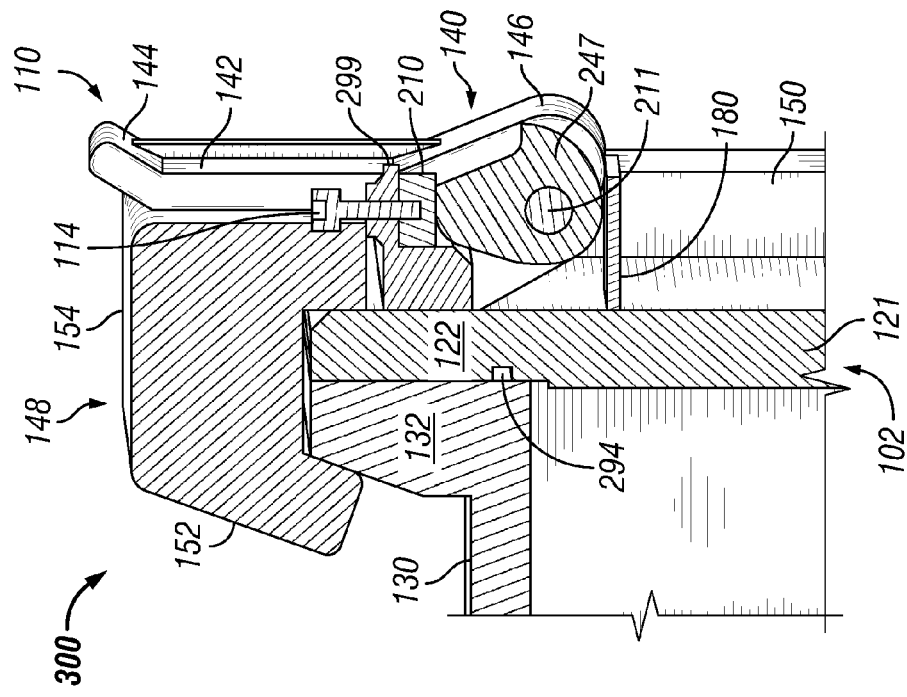
FIGS. 3A-3C show various views detailing the example fastening device of FIGS. 1-2B in accordance with certain example embodiments.
Figure 3A:
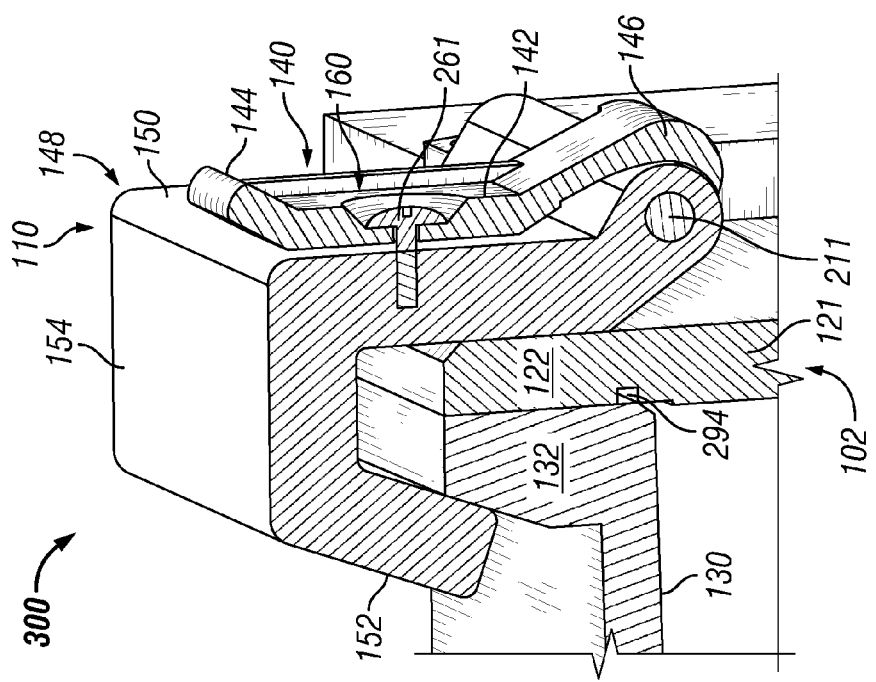
Figure 3C:
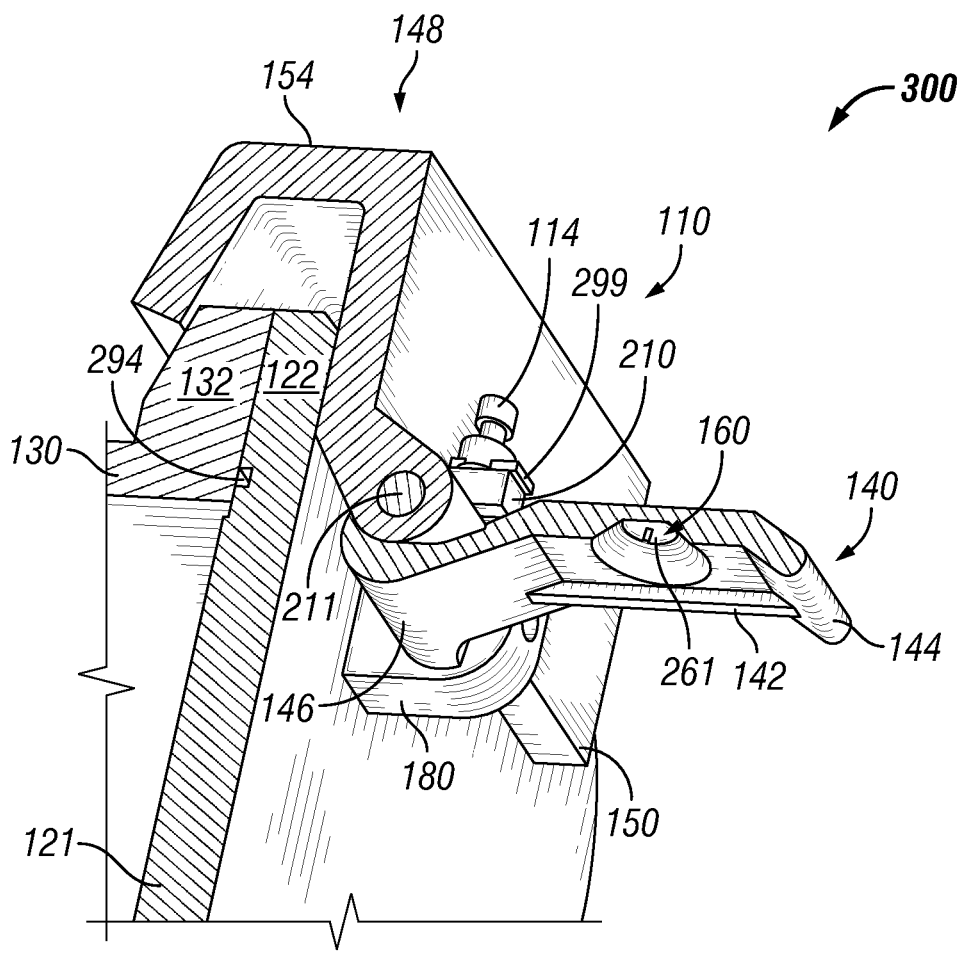

FIGS. 3A-3C show various views detailing the example fastening device 110 shown in FIGS. 1-2B for an explosion-proof enclosure 300. Specifically, FIGS. 3A-3C each show a different cross-sectional side perspective view of the fastening device 110 to provide detail as to how, in certain example embodiments, the lever 140 is used to engage the bracket 148 with, and disengage the bracket 148 from, the enclosure 300. In particular, referring to FIGS. 1-3C, the bracket 148 engages the enclosure 300 when the lever 140 is put in the closed position, which occurs by pushing the handle 144 downward (or upward if the fastening device 110 is oriented in the opposite direction), toward the bracket 148. As this occurs, the cam 247 of the fastening device 110 is engaged and draws the bracket 148 toward the enclosure 300 (downward in FIGS. 3A-3C). When the bracket 148 is drawn toward the explosion-proof enclosure 300, the bottom side 152 of the bracket 148 supplies a compressive force to the base flange 132 against the cover flange 122 to reduce the flame path 169.

An optional securing device 261 can be mechanically coupled to a portion (e.g., the top side 150) of the bracket 148. In certain example embodiments, when the lever 140 reaches the fully-closed (engaged) position, an optional securing device 261 traverses an aperture 160 in a portion (e.g., along the body 142) of the lever 140 and engages that portion of the lever 140 to secure the lever 140 in the fully-closed (engaged) position. For example, as shown in FIG. 3A, the securing device 261 is a screw that is disposed within and engages a slot in the aperture 160 in the body 142 of the lever 140 to secure the lever 140 against the bracket 148 when the lever 140 is in the fully-closed position. The securing device 261 provides tamper resistance and can require a tool (not shown) to release the lever 140. The tool can be a specially-designed tool or a standard tool (e.g., a screwdriver). Other examples of the securing device 261 can include, but are not limited to, a screw, a detent, and a bolt. Further, the securing device 261 can be positioned in one or more of a number of different locations with respect to the lever 140. Other examples of a securing device are described in U.S. patent application Ser. No. 13/794,402, entitled "Fastening Devices for Explosion-Proof Enclosures," filed with the U.S. Patent and Trademark Office on Mar. 11, 2013, and whose entire contents are hereby incorporated herein by reference.

FIG. 3B shows how the compressive force applied by the bracket 148 can be adjusted. A fastener 114 can be driven into and/or extracted from an aperture along the edge 299 of a mounting support 180. As shown in FIG. 3B, the edge 299 of a mounting support 180 can be horizontal, vertical (as shown), or have a slope. When the fastener 114 is oriented horizontally through the edge 299, the fastener 114 can be driven into and/or extracted from the edge 299 of the mounting support 180. In such a case, as the fastener 114 is driven into and extracted away from the cam 247, a horizontal force is applied to and taken away from, respectively, the cam 247 by the optional wear plate 210. The optional wear plate 210 can be positioned between the edge 299 and the cam 247. The wear plate 210 can align with the aperture through the edge 299 that is traversed by the fastener 114. By having the fastener 114 and wear plate 210 oriented substantially as shown, less force (e.g., ⅔ less force) may be used to drive the fastener 114 into and/or extract the fastener 114 from the edge 299 of a mounting support 180. As a result, less effort is required to adjust the compressive force applied by the bracket 148 through the cam 247.

Such adjustments to the fastener 114 can be made during manufacturing and/or in the field. The wear plate 210 is used to apply the proper load to the cam 247, and which causes the proper amount of force to be applied by the bracket 148 on the enclosure 300 to provide a proper flame path 169. If too much clamping force is required of the cam 247, the flame path 169 will be too small, which could increase the pressure developed from an explosion inside the explosion-proof enclosure 300 and exceed the strength of the explosion-proof enclosure 300. If too little clamping force is required of the cam 247, the flame path 169 will be too large, which could let the flame escape from the explosion-proof enclosure 300. In either case, the standards required for an explosion-proof 300 may not be met.

FIGS. 3A-3C help illustrate how moving the handle 144 to transition the lever 140 from the fully-closed position (as shown in FIGS. 3A and 3B) to the open position (as shown in FIG. 3C) also moves the bracket 148 from engaging the enclosure 300 (specifically, the cover flange 122 and the body flange 132) to disengaging the enclosure 300. When this occurs, explosion-proof enclosure 300 can be opened. First, the engaging member 261 is released (in this case, unscrewed) from the aperture 160 within the body 142 of the lever 140. Releasing the engaging member 261 may be performed using a tool. Then, the lever 140 is lifted upward by the handle 144 and toward the explosion-proof enclosure 300. Finally, the enclosure cover 102 is lifted in a certain direction (e.g., upward) so that the engagement features 225 become disengaged from the engagement features 235. Subsequently, the enclosure cover 102 can be moved away from the enclosure body 104.

As the lever 140 moves away from the fully-closed position to the open position, the cam 247 rotates and pushes the engagement portion (and thus the rest of the bracket 148) away from the enclosure 300. In certain example embodiments, the distance that the engagement portion is pushed away from the enclosure 300 is limited by the extent that the wear plate 210 is positioned relative to the cam 247. Such a method of disengaging the bracket 140 from the enclosure 300 is advantageous if oxidation has formed between the bracket 140 and the enclosure 300 because separating the two is easier and less prone to breaking or damaging the bracket 140, the enclosure 300, or some other component or device associated with the enclosure 300. When the bracket 148 is pushed away from the explosion-proof enclosure 300, the compressive force supplied by the bottom side 152 of the bracket 148 to the base flange 132 is reduced or eliminated. In such a case, as the bracket 148 is pushed away from the explosion-proof enclosure 300, the sealing member 294 is decompressed, removing the seal against ingress and widening and/or eliminating the flame path 169.

As all of the fastening devices 110 are mounted on the top surface of the enclosure cover 102, there is an area (e.g., the elevated inner portion 120) on the top surface of the enclosure cover 102 within which existing components (e.g., switches, indicating lights, pushbuttons) on the outer surface of the enclosure cover 102 can be located without interfering with the operation of such fastening devices 110. The size of this area can vary. For example, the distance between an edge of the enclosure cover 102 and the closest portion of the area may be two inches or less.

Further, the profile of a fastening device 110 can be relatively small. For example, the distance between the top of the back side 154 of the bracket 148 and the top of the hinged coupling feature 146 and/or the handle 144 of the lever 140 should be as small as possible (e.g., no more than two inches). As another example, the distance between the bottom of the back side 154 and the end of the bottom side 152 can be minimal (e.g., no more than one inch).

Such distances can be larger, particularly when example fastening devices 110 described herein are used to retrofit an existing explosion-proof enclosure that has bolts or other traditional fastening devices. In such a case, the characteristics (e.g., height, width, depth, location of components disposed on the cover) of the existing explosion-proof enclosure can dictate the size of the fastening device 110.

Figure 4:
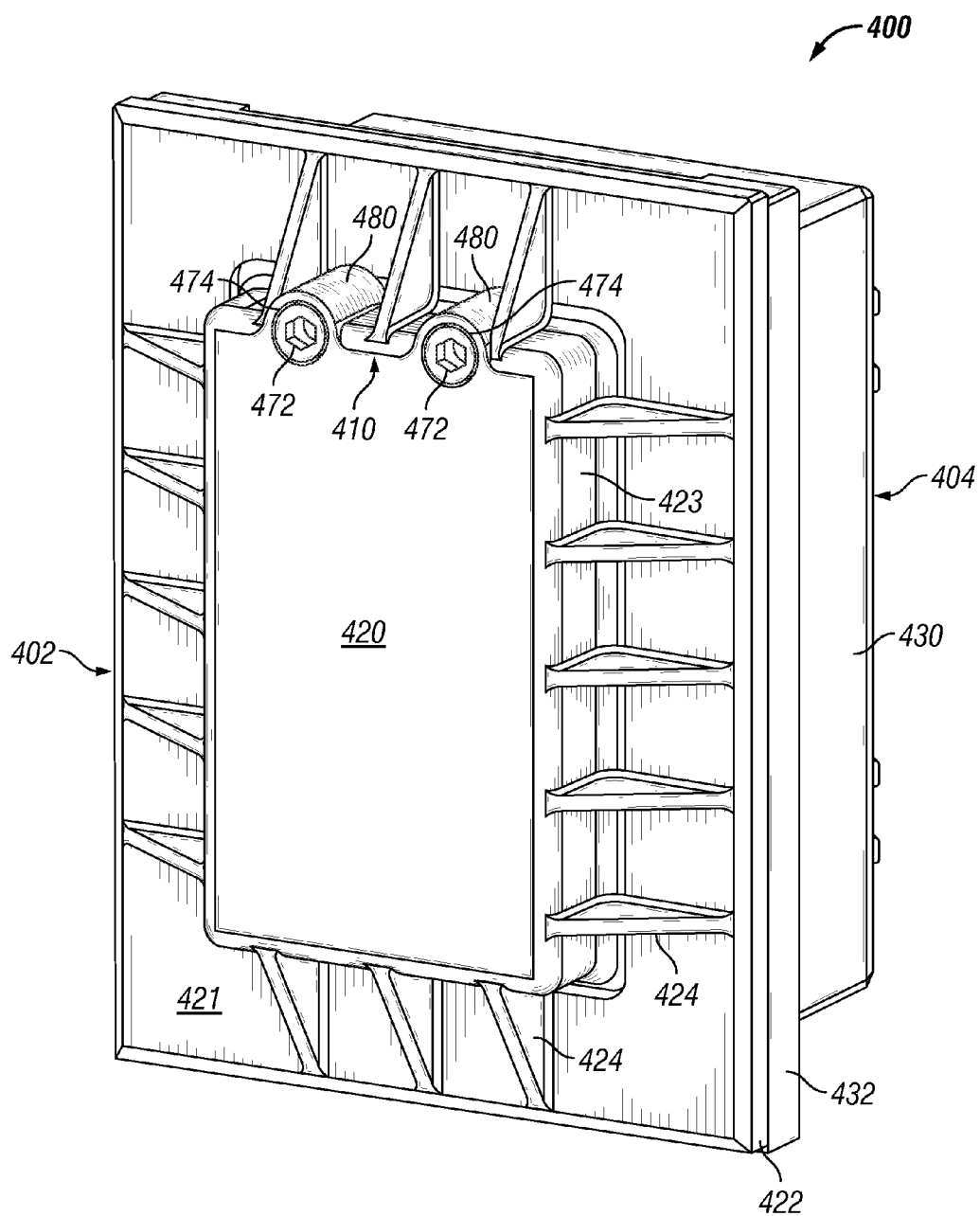
FIG. 4 shows a front perspective view of an explosion-proof enclosure with another example fastening device in accordance with certain example embodiments.

FIG. 4 shows a front perspective view of an explosion-proof enclosure 400 with another example fastening device 410 in accordance with certain example embodiments. In one or more embodiments, one or more of the features shown in FIG. 4 may be omitted, added, repeated, and/or substituted. Accordingly, embodiments of an explosion-proof enclosure with fastening devices should not be considered limited to the specific arrangements of components shown in FIG. 4.

Referring to FIGS. 1-4, aside from the fastening device 410, as explained below, the explosion-proof enclosure 400 (including the enclosure cover 402 and the enclosure body 404) of FIG. 4 is substantially the same as the explosion-proof enclosure 100 of FIG. 1 and the explosion-proof enclosure 200 of FIGS. 2A and 2B. The fastening devices 410 of FIG. 4 are each operated by a cam 472 that traverses the enclosure cover 402. Specifically, the cam 472 can traverse the outer portion 421 (and/or some other portion) of the enclosure cover 402. In such a case, an additional flame path 474 is created between the cam 472 and the enclosure cover 402.

The cam 472 can be housed, at least in part, within a mounting support 480. In certain example embodiments, the mounting support 480 can be part of, or can be coupled to, the wall 423 (and/or some other portion) of the enclosure cover 402. The cam 472 can be rotated (opened and closed) using a tool (not shown), such as an hex-head wrench. The details of the fastening device 410 are shown in FIGS. 5A and 5B. While FIG. 4 shows two fastening devices 410, example embodiments can have only one fastening device or more than two fastening devices. With multiple fastening devices 410, each fastening device can be positioned at any location along the top surface of the enclosure cover 402.

FIGS. 5A and 5B each shows a cross-sectional side perspective view of an enclosure system 500 that includes the explosion-proof enclosure of FIG. 4 and detailing the example fastening device 410 in accordance with certain example embodiments. Specifically, FIG. 4A shows the enclosure cover 402 mechanically coupled to the enclosure body 404. FIG. 4B shows the enclosure cover 402 mechanically decoupled from the enclosure body 404. In one or more embodiments, one or more of the features shown in FIGS. 4A and 4B may be omitted, added, repeated, and/or substituted. Accordingly, embodiments of an explosion-proof enclosure with fastening devices should not be considered limited to the specific arrangements of components shown in FIGS. 4A and 4B.

Referring to FIGS. 1-5B, the engagement features 425 can be substantially the same as the engagement features 225 described above with respect to FIGS. 2A and 2B. Similarly, the engagement features 435 can be substantially the same as the engagement features 235 described above with respect to FIGS. 2A and 2B. As far as the rest of the fastening device 410, a cam 472 includes a shaft 473 that traverses the thickness of the enclosure cover 402 (in this case, the cover flange 422) and is disposed within the mounting support 480. The end of the shaft 473, inside the enclosure body 404, is mechanically coupled to a fastening feature 474.

As described above with respect to FIG. 4, a portion of the cam 472 is positioned and accessible outside the enclosure cover 402, regardless of whether the enclosure cover 402 is mechanically coupled to the enclosure body 404. Thus, by moving (e.g., rotating) the cam 472 from outside the enclosure cover 402 (for example, by using a tool), the fastening feature 474 coupled to the end of the shaft 473 also rotates. When the cam 472 rotates into the closed position, and when the enclosure cover 402 is mated against the enclosure body 404, the fastening feature 474 couples to a fastening feature 491 disposed on an inner portion of the enclosure body 404.

In certain example embodiments, the fastening feature 491 disposed on an inner portion of the enclosure body 404 can form a single piece with the remainder of the enclosure body 404, as from a cast, or can be a separate piece that is mechanically coupled to the enclosure body 404. In the latter case, the fastening feature 491 can be mechanically coupled to the enclosure body 404 using one or more of a number of coupling methods, including but not limited to fastening devices, welding, mating threads, and compression fittings.

The fastening feature 491 can include one or more of a number of features that allow for a uniform and/or controlled flame path 469 around the perimeter of the body flange 442 when the enclosure cover 402 is mechanically coupled to the enclosure body 404. For example, the back side 439 (i.e., the side furthest away from the mating surface of the body flange 432 when the body flange 432 is mated against the cover flange 422 to create the flame path 469) of the fastening feature 491 can form an obtuse angle 441 with the top end 443 of the enclosure body 404. In such a case, as the fastening feature 474 rotates with the cam 472 into the closed position, the fastening feature 474 is forced further away from the mating surface of the body flange 432 when the body flange 432 is mated against the cover flange 422 to create the flame path 469. In such a case, the flame path 469 can be controlled, at least in part, by the degree of the obtuse angle 441, the length of the shaft 473, and/or the contour of the fastening feature 474.

The fastening feature 474 can have an oblong (e.g., rectangular. oval) shape with a long side and a short side, so that the long side of the fastening feature 474 contacts the back side 439 of the fastening feature 491 when the cam 472 is in the closed position. When the cam 472 is in the open position, the fastening feature 474 rotates (e.g., 90°) so that the short side of the fastening feature 474 is proximate to the back side 439 of the fastening feature 491.

An example of another feature of the fastening feature 491 that can allow for a uniform and/or controlled flame path 469 around the perimeter of the body flange 442 when the enclosure cover 402 is mechanically coupled to the enclosure body 404 is one or more contours along the back side 439 of the fastening feature 491. Examples of such contours can include, but are not limited to, a slot (e.g., to hold the fastening feature 474 in the closed position), a curvature, a ridge, and a textured surface.

In certain example embodiments, the fastening feature 474 can form a single piece with the shaft 473 of the cam 472. Alternatively, the fastening feature 474 can be a separate piece that is mechanically coupled to the shaft 473 using one or more of a number of coupling methods, including but not limited to fastening devices, welding, mating threads, and compression fittings. The fastening feature 474 can be fixed or moveable relative to the shaft 473. If the fastening feature 474 is moveable relative to the shaft 473, then the fastening feature 474 can be adjusted to provide for a flame path 469 having desired (or required) characteristics.

Similar to the fastening feature 491, the fastening feature 474 can have one or more of a number of features to allow for a more uniform and/or controlled flame path 469 around the perimeter of the body flange 442 when the enclosure cover 402 is mechanically coupled to the enclosure body 404. Examples of such features can include, but are not limited to, a spiral shape, a curved mating surface, and a textured mating surface. Such features of the fastening feature 474 can complement a corresponding feature of the fastening feature 473.

As stated above with respect to FIGS. 2A and 2B, the engagement features 425 and/or the engagement features 435 can move when the fastening device 410 moves between the open position and the closed position. The rotation of the cam 472 between the open position and the closed position. For example, the cam 472 may only be able to rotate approximately 90° between the open position and the closed position.

Example embodiments of fastening devices for explosion-proof enclosures resist explosion and/or hydrostatic forces by maintaining a flame path where the cover flange and the body flange are coupled. Further, using the example fastening devices described herein and other embodiments of these example fastening devices allows for efficient and effective coupling and/or decoupling of the cover and the body of the explosion-proof enclosure. In addition, using example embodiments of fastening devices allows for increased flexibility with regard to where components are positioned on the cover and/or where conduit can be manually coupled to the explosion-proof enclosure. Further, using example embodiments of fastening devices for explosion-proof enclosures allows the flame path to exist within the requirements of one or more standards and/or regulations for explosion-proof enclosures. Example embodiments leverage the weight of the enclosure cover to interlock the various mating features (e.g., securing features, engagement features) of the enclosure cover and the enclosure body.

Accordingly, many modifications and other embodiments set forth herein will come to mind to one skilled in the art to which fastening devices for explosion-proof enclosures pertain having the benefit of the teachings presented in the foregoing descriptions and the associated drawings. Therefore, it is to be understood that fastening devices for explosion-proof enclosures are not to be limited to the specific embodiments disclosed and that modifications and other embodiments are intended to be included within the scope of this application. For example, a fastening device does not need to include a bracket and/or a cam. Although specific terms are employed herein, they are used in a generic and descriptive sense only and not for purposes of limitation.

What is claimed is:
1. An enclosure comprising:
   a first enclosure portion comprising a first flange, at least one first engagement feature disposed on a first inner surface of the first enclosure portion, and at least one mounting support;
   a second enclosure portion mechanically coupled to the first enclosure portion and comprising a second flange and at least one second engagement feature disposed on a second inner surface of the second enclosure portion; and
   at least one fastening device mechanically and movably coupled to the at least one mounting support, wherein the at least one fastening device engages the first flange and the second flange when the at least one fastening device is in a closed position, wherein the at least one fastening device is disengaged from the first flange and the second flange when the at least one fastening device is in an open position,
   wherein the at least one first engagement feature and the at least one second engagement feature are located inside a cavity formed by the first enclosure portion and the second enclosure portion, wherein the at least one first engagement feature couples to the at least one second engagement feature inside the cavity when the at least one fastening device is in the closed position, and wherein a first flame path is maintained between the first flange and the second flange when the at least one fastening device is in the closed position.

2. The enclosure of claim 1, wherein the at least one first engagement feature disposed on the first inner surface of the first enclosure portion is adjustable to ensure that the first flame path between the first flange and the second flange complies with a specification.

3. The enclosure of claim 1, wherein the at least one fastening device comprises:

a bracket comprising a back side mechanically coupled to a bottom side at a first angle and to a top side at a second angle, wherein the top side comprises an engagement portion, wherein the first angle is substantially parallel to an under side of the first flange, and wherein the second angle is substantially parallel to a top side of the second flange;

a hinged coupling feature hingedly coupled to the at least one mounting support and fixedly coupled to the bracket; and a handle fixedly coupled to the hinged coupling feature and having a first position corresponding to the closed position and a second position corresponding to the open position.

4. The enclosure of claim 3, wherein the second flange comprises a first portion having a first vertical profile that is less than that of a remainder of the second flange, wherein the bracket engages the first flange and the first portion of the second flange when the handle is in the closed position, and wherein the bracket is disengaged from the first flange and the first portion of the second flange when the handle is in the open position.

5. The enclosure of claim 3, wherein the first enclosure portion is a cover that further comprises an elevated inner portion and an outer portion, wherein the at least one mounting support is disposed on the outer portion adjacent to the elevated inner portion.

6. The enclosure of claim 3, further comprising a securing device mechanically coupled to the top side of the bracket, wherein the securing device engages the handle when the handle is in the closed position.

7. The enclosure of claim 6, wherein the securing device is disengaged from the handle using a tool.

8. The enclosure of claim 3, wherein the first angle is different from the second angle.

9. The enclosure of claim 1, wherein the first flange is part of the body of an explosion-proof enclosure, and wherein the second flange is part of the cover of the explosion-proof enclosure.

10. The enclosure of claim 1, wherein the at least one fastening device comprises:

at least one cam disposed within the mounting support and that traverses the first enclosure portion, wherein each of the at least one cam comprises a shaft that mechanically couples to a first fastening feature, wherein the first fastening feature couples to a second fastening feature disposed on an inner portion of the second enclosure portion when the cam is in the closed position, and wherein the first fastening feature decouples from the second fastening feature when the cam is in the open position.

11. The enclosure of claim 10, wherein the cam rotates approximately 90° between the closed position and the open position.

12. The enclosure of claim 10, wherein the cam rotates using a tool.

13. The enclosure of claim 10, wherein each first engagement feature decouples from a corresponding second engagement feature as the cam rotates to the open position.

14. The enclosure of claim 10, wherein the cam and the mounting support form a second flame path.

15. The enclosure of claim 10, wherein the at least one first engagement feature disposed on the first inner surface of the first enclosure portion moves when the cam moves between the open position and the closed position.

16. The enclosure of claim 10, wherein the at least one second engagement feature disposed on the second inner surface of the second enclosure portion moves when the cam moves between the open position and the closed position.

17. The enclosure of claim 10, wherein the at least one second engagement feature comprises at least one feature that allows for the first flame path when the first enclosure portion is mechanically coupled to the second enclosure portion.

18. The enclosure of claim 1, wherein the at least one fastening device can be adjusted using a fastener disposed within a portion of the at least one mounting support.

19. The enclosure of claim 1, wherein the first enclosure portion further comprises a first securing feature disposed along a third inner surface, and wherein the second enclosure portion further comprises a second securing feature disposed along a fourth inner surface.

* * * * *